(12) United States Patent
Nakamori (10) Patent No.: US 7,904,247 B2
(45) Date of Patent: Mar. 8, 2011

(54) DRIVE ASSIST SYSTEM FOR VEHICLE

(75) Inventor: Yasutaka Nakamori, Anjo (JP)

(73) Assignee: Denso Corporation, Kariya (JP)

( * ) Notice: Subject to any disclaimer, the term of this patent is extended or adjusted under 35 U.S.C. 154(b) by 561 days.

(21) Appl. No.: 12/079,028

(22) Filed: Mar. 24, 2008

(65) Prior Publication Data
US 2008/0243390 A1  Oct. 2, 2008

(30) Foreign Application Priority Data

Mar. 27, 2007 (JP) ................. 2007-082707

(51) Int. Cl.
*G08G 1/16* (2006.01)
(52) U.S. Cl. .......... 701/301; 701/65; 340/435; 340/436; 180/168; 382/104
(58) Field of Classification Search .............. 701/1, 2, 701/10, 65, 82, 301; 382/104; 340/425.5, 340/435–436, 438–439; 180/167–169, 232
See application file for complete search history.

(56) References Cited

U.S. PATENT DOCUMENTS

| | | | | |
|---|---|---|---|---|
| 5,680,313 | A | * | 10/1997 | Whittaker et al. ............ 701/300 |
| 6,069,581 | A | * | 5/2000 | Bell et al. ........................ 342/70 |
| 6,400,308 | B1 | * | 6/2002 | Bell et al. ........................ 342/71 |

FOREIGN PATENT DOCUMENTS

| | | |
|---|---|---|
| JP | 10-105880 | 4/1998 |
| JP | 2001-023098 | 1/2001 |
| JP | 2001-101599 | 4/2001 |
| JP | 2001-167387 | 6/2001 |
| JP | 2001-283380 | 10/2001 |
| JP | 2001-319295 | 11/2001 |
| JP | 2001-331900 | 11/2001 |
| JP | 2002-104115 | 4/2002 |
| JP | 2002-245597 | 8/2002 |
| JP | 2004-038244 | 2/2004 |
| JP | 2006-195641 | 7/2006 |
| JP | 2006-236094 | 9/2006 |

OTHER PUBLICATIONS

Office Action dated Dec. 24, 2008 in Japanese Application No. 2007-082707.
Office Action dated Sep. 24, 2009 in corresponding Japanese Application No. 2007-082707.

* cited by examiner

*Primary Examiner* — Gertrude Arthur Jeanglaud
(74) *Attorney, Agent, or Firm* — Harness, Dickey & Pierce, PLC

(57) ABSTRACT

An in-vehicle drive assist system adjusts a viewing angle of a camera mounted in a vehicle using environmental information obtained from outside the vehicle. An early risk determination is thus allowed to be made in the vehicle, while maintaining reliability.

5 Claims, 5 Drawing Sheets

DRIVE ASSIST SYSTEM FOR VEHICLE

CROSS REFERENCE TO RELATED APPLICATION

This application is based on and incorporates herein by reference Japanese Patent Application No. 2007-82707 filed on Mar. 27, 2007.

FIELD OF THE INVENTION

The present invention relates to a drive assist system for a vehicle.

BACKGROUND OF THE INVENTION

Conventionally, drive assist technologies such as disclosed in Patent Documents 1 to 6 have been proposed in each of which a roadside apparatus provides information required by a vehicle to drive safely to an in-vehicle apparatus, and the in-vehicle apparatus assists the vehicle to drive based on the provided information.

Patent Document 1: JP-2001-23098 A
Patent Document 2: JP-2001-101599 A
Patent Document 3: JP-2001-167387 A
Patent Document 4: JP-2001-319295 A
Patent Document 5: JP-2004-38244 A
Patent Document 6: JP-2006-236094 A The roadside information provided by the roadside apparatus includes information on an obstacle which cannot be sensed or viewed by various sensors (hereinafter referred to as autonomous sensors) mounted in the vehicle. Therefore, the use of such roadside information by the vehicle operator allows an early risk determination to be made for an obstacle or the like present around the vehicle but not viewable from the vehicle.

However, the roadside information has the possibility of being "spoofing" information and the accuracy of the roadside information (e.g., the accuracy of obstacle detection) is unknown to the vehicle operator. Accordingly, the reliability of the information is generally low compared with information provided by the autonomous sensors.

That is, compared with the information provided by the autonomous sensors, the roadside information allows an early risk determination, but the reliability thereof is low. On the other hand, the information provided by the autonomous sensors is higher in reliability than the roadside information, but it does not allow an early risk determination.

Thus, the roadside information and the information provided by the autonomous sensors have their respective advantages and disadvantages so that an in-vehicle drive assist system which allows an early risk determination has been in demand.

SUMMARY OF THE INVENTION

The present invention has been achieved in view of the foregoing problems. It is an object of the present invention is to provide an in-vehicle drive assist system which allows an early risk determination to be made, while maintaining reliability.

According to an example of the present invention, a drive assist system for a vehicle is provided as follows. The drive assist system receives, from outside the vehicle, external information including positional information of an object outside the vehicle to thereby assist the vehicle to travel. The drive assist system includes the following. An autonomous detecting unit is configured to detect a viewable object which is at least one of (i) an other vehicle and (ii) a pedestrian. A control unit is configured to perform a control operation for adjusting at least one of (i) a detection range of the autonomous detecting unit and (ii) sighting of the detection range, using positional information of the object included in the received external information. An object detection determining unit is configured to make a determination as to whether or not an object is detected by the autonomous detecting unit after at least one of (i) the detection range of the autonomous detecting unit and (ii) the sighting of the detection range is adjusted by the control unit. A risk determining unit is configured to make a determination about a risk of the vehicle relative to the object when the determination by the object detection determining unit is affirmed. A drive assist unit is configured to provide a drive assistance in accordance with a result of the determination by the risk determining unit.

According to another example of the present invention, a method is provided for performing drive assistance in a vehicle having an autonomous detecting unit detecting a viewable object which is at least one of (i) an other vehicle and (ii) a pedestrian. The method includes the following: receiving, from outside the vehicle, external information including positional information of an object outside the vehicle; performing a control operation for adjusting at least one of (i) a detection range of the autonomous detecting unit and (ii) sighting of the detection range, using positional information of the object included in the received external information; making a first determination as to whether or not an object is detected by the autonomous detecting unit after at least one of (i) the detection range of the autonomous detecting unit and (ii) the sighting of the detection range is adjusted; making a second determination about a risk of the vehicle relative to the object when the first determination is affirmed; and providing a drive assistance in accordance with a result of the second determination.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
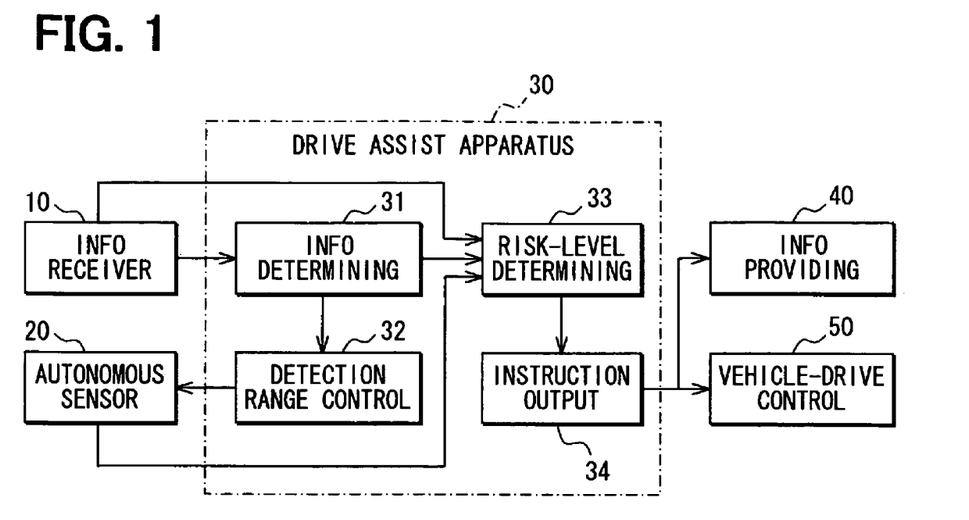
FIG. 1 is a block diagram showing an overall structure of an in-vehicle drive assist system according to an embodiment of the present invention.

Referring to the drawings, an embodiment of an in-vehicle drive assist system for a vehicle according to an embodiment of the present invention will be described. FIG. 1 shows an overall structure of the in-vehicle drive assist system. The in-vehicle drive assist system is mounted in a subject vehicle. The in-vehicle drive assist system includes an infrastructural information receiver 10, a set of autonomous sensors 20, a drive assist apparatus 30, an information providing device 40, and a vehicle-drive control device 50.

The infrastructural information receiver 10 may function as an external information acquiring device as follows. The infrastructural information receiver 10 performs roadside-to-vehicle communication for receiving, from a roadside apparatus disposed on the side of a road, infrastructural information acquired by the roadside apparatus. The infrastructural information can be referred to as external information or environmental information and includes object-by-object positional information (latitude/longitude or the like) of each object such as another vehicle, a pedestrian, or the like present around the vehicle, travel direction information (an angle of deflection when due north is assumed to be a 0 degree or the like), and driving speed information (a speed per hour or the like). The infrastructural information primarily includes information on an object which cannot be viewed from the vehicle, but may also include information on an object which can be viewed from the vehicle.

The infrastructural information receiver 10 may also be capable of vehicle-to-vehicle communication. In other words, the infrastructural information receiver 10 may also receive, from another vehicle, another-vehicle information including the positional information, the travel direction information, and the driving speed information of the other vehicle.

Figure 2:
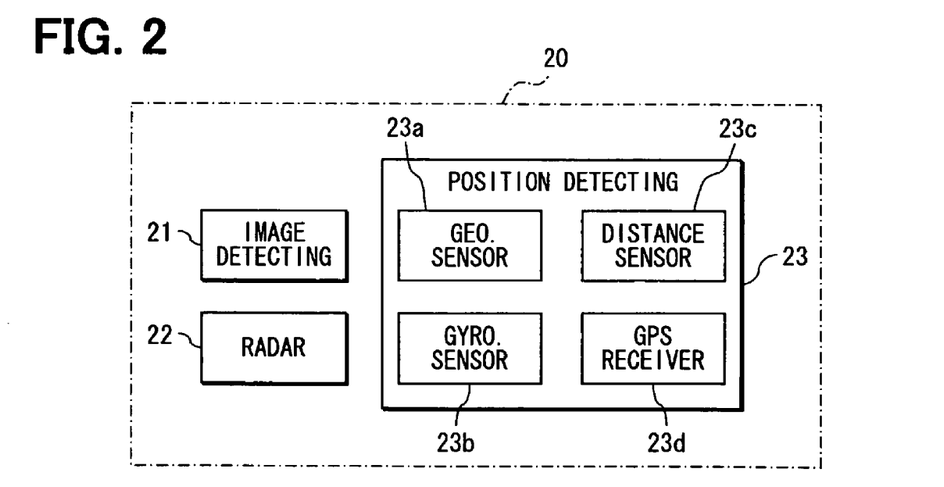
FIG. 2 is a block diagram showing a structure of a set of autonomous sensors.

The set of autonomous sensors 20 is composed of an image detecting apparatus 21, a radar device 22, and a position detecting apparatus 23, as shown in FIG. 2. The position detecting apparatus 23 detects the current position of the subject vehicle and is composed of a geomagnetic sensor 23a for detecting the bearing of travel of the vehicle from earth magnetism, a gyroscope sensor 23b for detecting the magnitude of the rotational movement of the vehicle, a distance sensor 23c for detecting a mileage from an acceleration generated in the fore-and-aft direction of the vehicle or the like, and a GPS receiver 23d for receiving an electric wave transmitted from a satellite for a GPS (Global Positioning System) via a GPS antenna to detect the current position of the vehicle.

Figure 3:
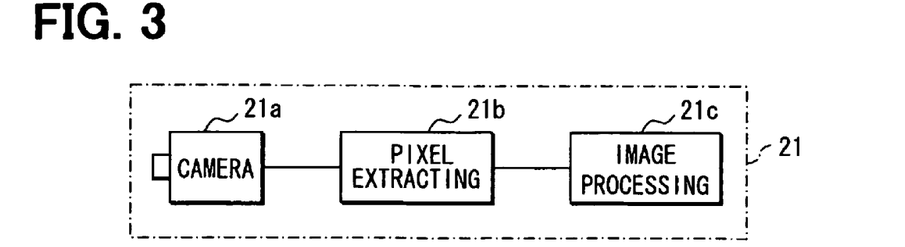
FIG. 3 is block diagram showing a structure of an image detecting apparatus.

The image detecting apparatus 21 is composed of a camera 21a using an image sensing element such as a CCD (Charge Coupled Device) or the like, a specified pixel extracting device 21b for receiving image data of all the pixels of an image sensed by the camera 21a, extracting those of the pixels specified from the drive assist apparatus 30, and transmitting image data of the extracted pixels to an image processing device 21c, and the image processing device 21c for receiving the image data transmitted from the specified pixel extracting device 21b in accordance with an NTSC (National Television Standards Committee, 30 frames per second, and about 300 thousand pixels per frame) method and performing predetermined image processing, as shown in FIG. 3.

For the camera 21a, an image sensing element having a high resolution of, e.g., several millions of pixels is adopted. Since the specified pixel extracting device 21b transmits image data to the image processing device 21c in accordance with the NTSC method, the number of pixels is limited to about 300 thousand. Accordingly, the specified pixel extracting device 21b extracts only the pixels specified to reduce the sensed image to an image of about 300 thousand pixels and transmits the extracted image data to the image processing device 21c.

In a normal case, the drive assist apparatus 30 specifies pixels to be extracted such that the pixels composing the image are generally uniformly thinned out. On the other hand, when the viewing angle of the camera 21a is reduced to a given angle range, the drive assist apparatus 30 specifies pixels to be extracted such that, of the pixels composing the image, those included in the range corresponding to the reduced viewing angle are extracted. The image processing device 21c performs the predetermined image processing with respect to the image data and recognizes an object displayed as an image.

Figure 5:
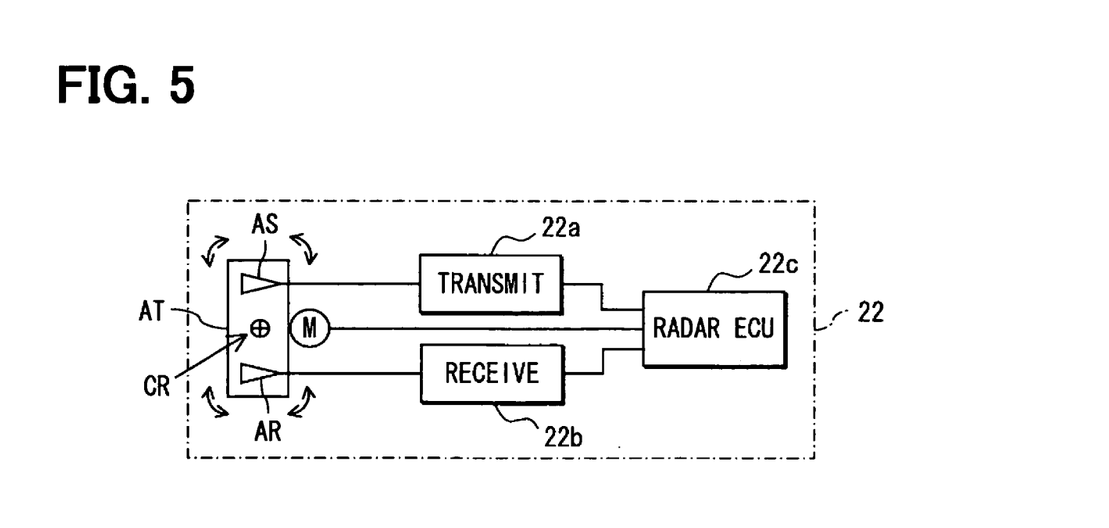
FIG. 5 is a bock diagram showing a structure of a radar device.

As shown in FIG. 5, the radar device 22 is composed of an antenna AT including a transmission antenna AS and a reception antenna AR, a transmission circuit 22a, a reception circuit 22b, a radar ECU 22c, and a motor M for rotating the transmission/reception direction (sighting of the detection range or center detection direction of the detection range) of the antenna AT in the lateral direction of the vehicle around the rotation axis CR of the antenna AT. The radar device 22 sends an electric wave in the millimeter wave band from the transmission antenna AS and receives the wave reflected by an object at the reception antenna AR, thereby detecting the distance between the object which has reflected the electric wave and the vehicle, the relative speed of the object, and the relative bearing thereof to the vehicle. The radar ECU 22c drives the motor M such that the transmission/reception direction of the antenna AT matches the bearing specified from the drive assist apparatus 30.

The drive assist apparatus 30 shown in FIG. 1 acquires the infrastructural information received by the infrastructural information receiver 10 as well as autonomous sensor information detected by the set of autonomous sensors 20, determines the risk of the vehicle relative to an object present around or outside the vehicle, and provides drive assistance in accordance with the result of the determination using an information providing device 40 and a vehicle-drive control device 50.

The information providing device 40 is composed of a display device and a sound output device each not shown to provide information or an alarm for invoking the attention of the driver to an object around the vehicle depending on the level of the risk of the vehicle relative to the object. The vehicle-drive control device 50 drives a brake actuator (not shown) in response to an instruction from the drive assist apparatus 30 to perform a control operation for decelerating or halting the vehicle.

The drive assist apparatus 30 is composed of an infrastructural information determining device 31, a detection range control device 32, a risk-level determining device 33, and a drive-assist-instruction output device 34, as shown in FIG. 1. The infrastructural information determining device 31 determines a target object (hereinafter simply referred to as the target object) having the risk of a collision with the vehicle from the object-by-object positional information, travel direction information, and driving speed information of each object included in the infrastructural information obtained from the infrastructural information receiver 10 and transmits the result of the determination to the risk-level determining device 33. The infrastructural information determining device 31 also transmits the infrastructural information and the result of the determination to the detection range control device 32.

To allow the set of autonomous sensors 20 to detect the target object at an early stage, the detection range control device 32 calculates the objective detection range of the set of autonomous sensors 20 and the sighting of the detection range based on the infrastructural information by using the location of the target object as a reference. That is, based on the infrastructural information, the future behavior (locus) of the target object is estimated from the current position thereof, and the reduced viewing angle θ/n of the camera 21a and the bearing of the transmission/reception direction of the antenna AT of the radar device 22 are calculated from the estimated behavior, the current position of the vehicle, the speed thereof, the bearing of travel thereof, and the like. From the results of the calculation, the coordinates of the pixels to be extracted corresponding to the viewing angle θ/n after the viewing angle of the camera 21a is reduced and the angle of rotation of the antenna AT are further calculated and transmitted to the set of autonomous sensors 20.

Figure 4A:
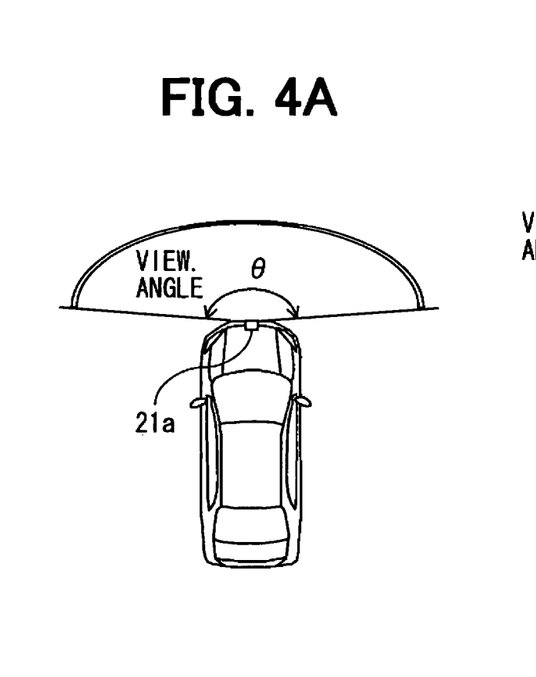
FIG. 4A is a view showing a viewing angle of a camera before the viewing angle is reduced.
Figure 4B:
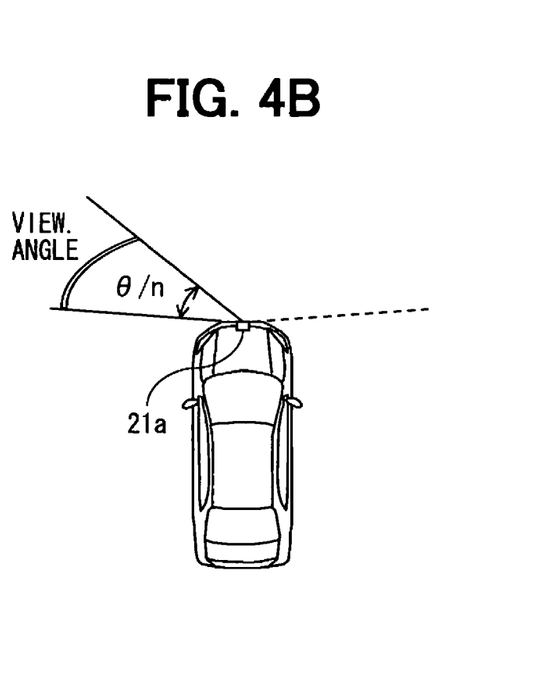
FIG. 4B is a view showing a viewing angle of the camera when the viewing angle is reduced.

FIG. 4A shows the viewing angle θ when the viewing angle of the cameral 21a is not reduced. Because the camera 21a uses a wide angle lens (not shown), it has a viewing angle of about 180 degrees laterally of the vehicle. FIG. 4B shows the viewing angle θ/n when the viewing angle is reduced to 1/n.

Thus, the present embodiment adjusts the viewing angle of the camera 21a based on the position of the target object such that it is reduced. When the viewing angle of the camera 21a is reduced, the number of pixels assigned to the reduced viewing angle is larger than before the viewing angle is reduced. This allows recognition of an object at a further distance away from the camera than before the viewing angle is reduced. For example, when the viewing angle θ is reduced to 1/n, it becomes possible to recognize a target object at an approximately n times larger distance away from the camera.

When the viewing angle θ is reduced to the viewing angle θ/n, the pixels at the pixel coordinates specified from the drive assist apparatus 30 are extracted and transmitted by the specified pixel extracting device 21b to the image processing device 21c. As a result, the image data received by the image processing device 21c forms an image at the reduced viewing angle. The specified pixel extracting device 21b may also be embedded in the camera 21a.

The radar device 22 drives the motor M such that the transmission/reception direction of the antenna AT matches the bearing specified from the drive assist apparatus 30. This allows an early detection of the target object using the image detecting apparatus 21 and the radar device 22 each capable of obtaining highly reliable autonomous sensor information.

When the target object is detected by the set of autonomous sensor 20, the risk-level determining device 33 shown in FIG. 1 determines the level (e.g., high and low two levels) of the risk of the vehicle relative to the target object. When the risk level as the result of the determination by the risk-level determining device 33 is low, the drive-assist-instruction output device 34 outputs, to the information providing device 40, a drive assist instruction for causing it to provide information or generate an alarm indicating the possible risk of colliding with the target object. As a result, it is possible to invoke the attention of the driver of the vehicle to the target object.

When the risk level as the result of the determination by the risk-level determining device 33 is high, the drive-assist-instruction output device 34 outputs, to the information providing device 40, the drive assist instruction for causing it to provide information or generate an alarm indicating the possible risk of colliding with the target object, while outputting a drive signal for driving the brake actuator to the vehicle-drive control device 50. As a result, it is possible to invoke the attention of the driver of the vehicle to the target object, while preventing a collision with the target object in advance and reducing the shock of the collision.

Figure 6:
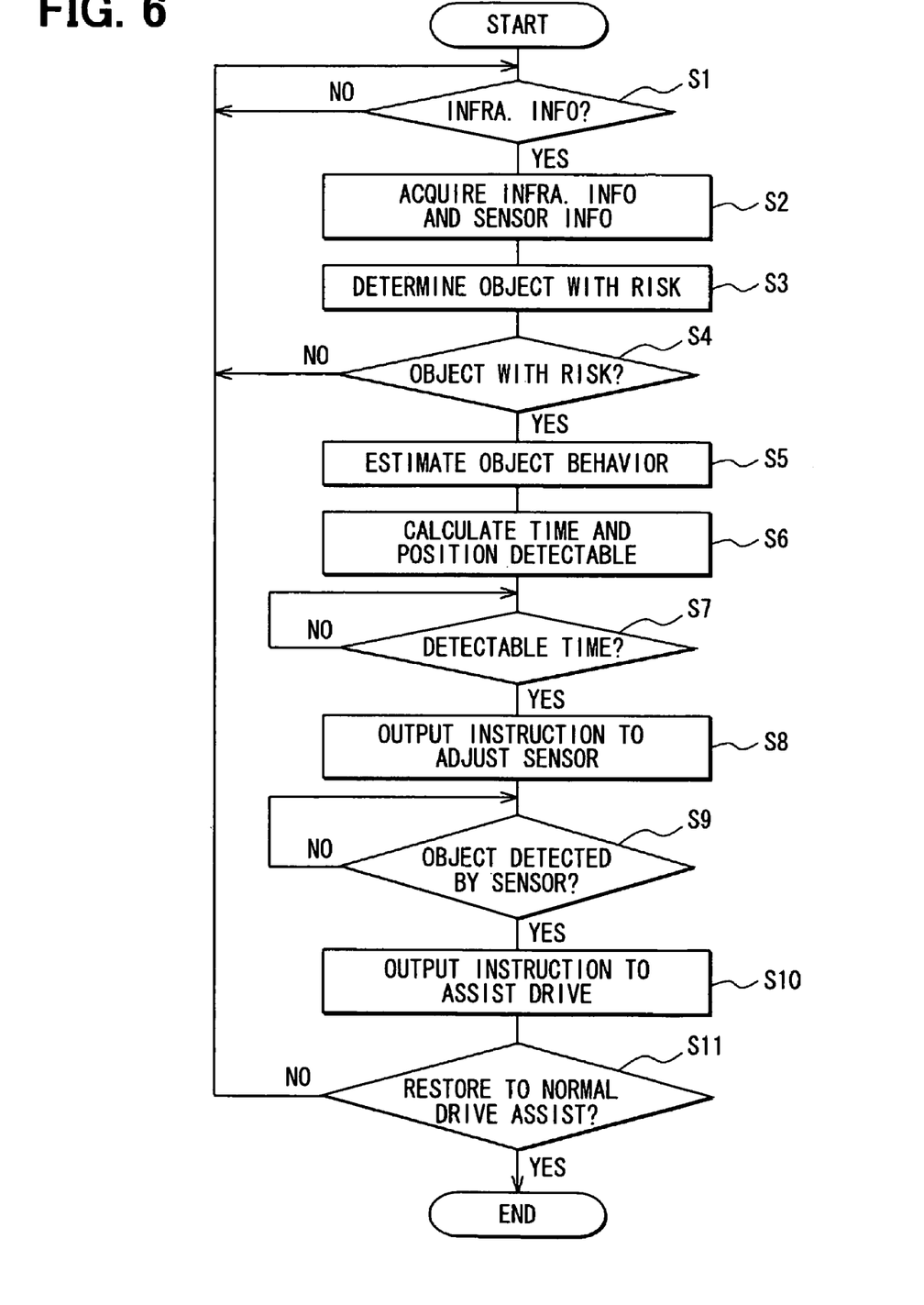
FIG. 6 is a flow chart for illustrating a drive assist process.

Next, a description will be given to a drive assist process by the drive assist apparatus 30 in the in-vehicle drive assist system using the flow chart shown in FIG. 6. In a step S1 of FIG. 6, it is determined whether or not the most recently acquired infrastructural information is present. When YES is given as a result of the determination, the process advances to a step S2. When NO is given as a result of the determination, a standby state is held until the latest infrastructural information is acquired.

In the step S2, the infrastructural information and the autonomous sensor information are acquired. In a step S3, a target object with the possible risk of colliding with the vehicle is determined. In a step S4, it is determined from the result of the determination in the step S3 whether or not there is the target object with the possible risk of colliding with the vehicle. When YES is given as a result of the determination, the process advances to a step S5. When NO is given as a result of the determination, the process moves to the step S1 where the process described above is repeated.

In the step S5, the behavior of the target object is estimated from the infrastructural information. In a step S6, the time (a time measured from the current time or the like) and position at which the target object enters the detectable range of the set of autonomous sensors 20 are calculated from the result of behavior estimation in the step S5.

In a step S7, it is determined whether or not the time at which the target object enters the detectable range of the set of autonomous sensors 20 is reached. When YES is given as a result of the determination, the process advances to a step S8. When NO is given as a result of the determination, the standby state is held until the time at which the target object enters the detectable range of the set of autonomous sensors 20 is reached.

In the step S8, instructions to tune or adjust the detection range of the set of autonomous sensors 20 and the sighting of the detection range based on the position of the target object are outputted to the set of autonomous sensors 20. The instructions include the coordinates of the pixels to be extracted to the image detecting apparatus 21 and the angle of rotation of the antenna AT to the radar device 22. In a step S9, it is determined whether or not the target object is detected by the set of autonomous sensors 20. When YES is given as a result of the determination, the process advances to a step S10. When NO is given as a result of the determination, the standby state is held until the target object is detected by the set of autonomous sensors 20.

In the step S10, the set of autonomous sensors 20 performs a tracking detection of the target object and an instruction is outputted to provide drive assistance in accordance with the level of the risk relative to the target object. In a step S11, it is determined whether or not a normal drive assist using only the set of autonomous sensors 20 is restored. When YES is given as a result of the determination, the present process is ended. When NO is given as a result of the determination, the process moves to the step S1 where the process described above is repeated.

Figure 7:
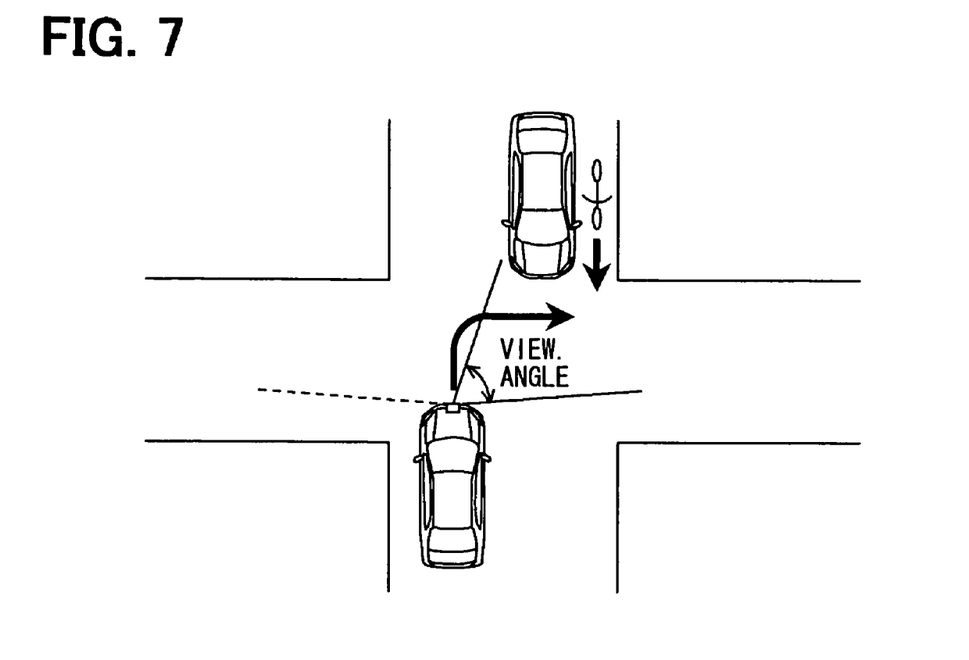
FIG. 7 is a view for illustrating a specific example in making a right-hand turn at an intersection.
Figure 8:
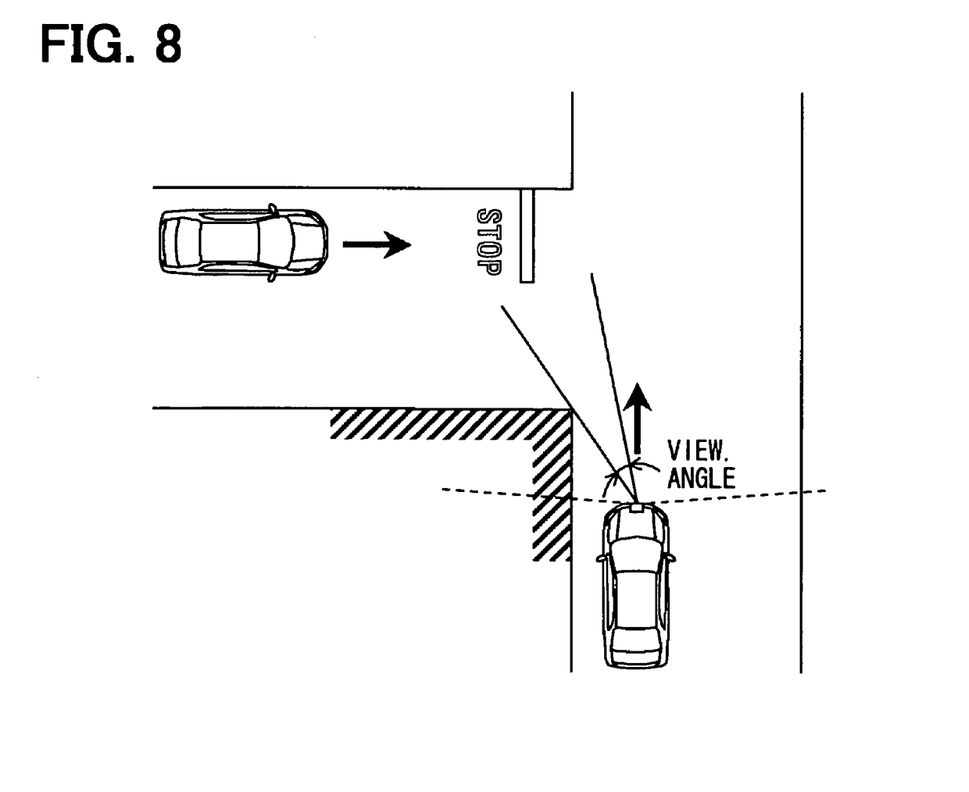
FIG. 8 is a view for illustrating a specific example in approaching a T-junction.
Figure 9:
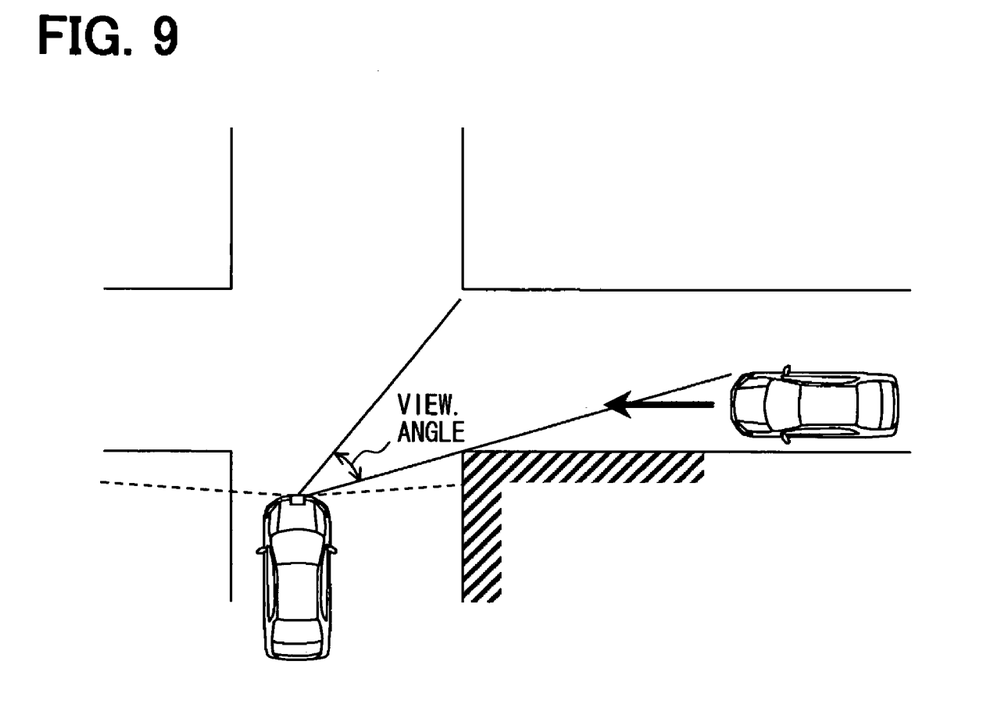
FIG. 9 is a view for illustrating a specific example in approaching an intersection which is low in visibility in the absence of a traffic light.

With reference to FIGS. 7 to 9, a specific description will be given to in what scenes the in-vehicle drive assist system according to the present embodiment achieves effects. The description will be given hereinbelow to the case when the viewing angle of the camera 21a is reduced.

(Right-Hand Turn at Intersection)

FIG. 7 shows a scene in which a two-wheeler is present in a blind spot behind an oncoming vehicle when the vehicle makes a right-hand turn at an intersection. In such a scene, a roadside apparatus can detect the position of the two-wheeler present in the blind spot behind the oncoming vehicle, the direction of travel thereof, and the driving speed thereof and allows the vehicle to recognize the presence of the two-wheeler from the infrastructural information. On the other hand, the set of autonomous sensors 20 cannot detect the two-wheeler which cannot be viewed from the vehicle.

In such a case, therefore, the viewing angle of the camera 21a is adjusted to be reduced to a position where the two-wheeler will assumedly rush out (appear from the blind spot behind the oncoming vehicle), as shown in FIG. 7. This allows a high-accuracy and early detection of the two-wheeler using the camera 21a. When the infrastructural information includes information indicating that the target object is the two-wheeler (i.e., information specifying the type of the target object), the recognition of the two-wheeler need not be made from the position and speed of the target object detected by the set of autonomous sensors 20 (or the level of the recognition of the two-wheeler may also be lowered instead). Information is provided which allows the provision of drive assistance in accordance with the risk level when the two-wheeler is detected by the set of autonomous sensors 20, and allows the vehicle to make a safe start when the two-wheeler passes in front of the vehicle.

Thus, the embodiment adopts such a method for tuning the detection range of the set of autonomous sensors 20 to the estimated position where the two-wheeler will appear and for adjusting sighting of the detection range. The method may also include calculating the direction of travel of the vehicle from the tracking locus of the vehicle, the angle of steering of the vehicle, or the like. Alternatively, it is also possible to detect a roadside object or another vehicle using the camera 21a, the radar device 22, and the like and then calculate the direction of travel of the vehicle from the position of the detected roadside object or other vehicle and the position of the vehicle.

(Approach to T-Junction)

FIG. 8 shows a scene in which, when a vehicle passes through a T-junction at which a stop sign is placed, another vehicle is approaching the T-junction from a non-preferential direction in which the other vehicle cannot be viewed from the vehicle. In such a case, a roadside apparatus can detect the position of the other vehicle which cannot be viewed from the vehicle, the direction of travel thereof, and the driving speed thereof, and the like and allows the vehicle to know the presence of the other vehicle from the infrastructural information. On the other hand, the set of autonomous sensors 20 cannot detect the other vehicle which cannot be viewed from the vehicle.

In such a case, therefore, the viewing angle of the camera 21a is adjusted to be reduced to a position where the other vehicle will assumedly rush out (appear from the blind spot), as shown in FIG. 8. This allows a high-accuracy and early detection of the other vehicle using the camera 21a.

The vehicle is decelerated until the other vehicle is detected using the set of autonomous sensors 20. The other vehicle is then detected using the set of autonomous sensors 20. When the other vehicle is at a halt, the deceleration of the vehicle is stopped. When the other vehicle is driving, the vehicle is halted. When the other vehicle has halted, information which allows the vehicle to make a safe start is provided. When the vehicle has passed through the T-junction, the drive assist process is ended.

(Unexpected Encounter at Intersection)

FIG. 9 shows a scene in which, when a vehicle passes through an intersection which is low in visibility in the absence of a traffic light, another vehicle is approaching the intersection from a right direction in which the other vehicle cannot be viewed from the vehicle. In such a scene, in a conventional method, a risk determination is made using only the autonomous sensor information. For instance, if the other vehicle is detected only using the image detecting apparatus 21, whether the other vehicle is approaching from the right direction or the left direction cannot be recognized until the vehicle approaches sufficiently close to the intersection. When the viewing angle of the camera 21a is about 180 degrees laterally of the vehicle, the displayed image of the other vehicle is small due to the wide viewing angle. From the sensed image, the other vehicle cannot be recognized as such until it approaches sufficiently close to the vehicle. Thus, an early risk determination cannot be made only with the autonomous sensor information.

In the scene described above, a risk determination may be made using only the infrastructural information. The infrastructural information is not usually real-time information because it may be information provided spotwise such as a light beacon or information limited to a specified range under the constraints on the detection range of the roadside apparatus. In addition, the infrastructural information is lower in reliability than the autonomous sensor information, as described above.

Therefore, in the scene described above, when information on the approach of the other vehicle from the right-hand side of the vehicle is obtained, the viewing angle of the camera 21a is reduced into a diagonally right forward direction based on the information, as shown in FIG. 9. This allows the other vehicle as the target object to be displayed as a large image. When the viewing angle is reduced to 1/n, the other vehicle can be recognized from a position at an approximately n times larger distance away from the camera 21a.

When the viewing angle of the camera 21a cannot be reduced, it is also possible to narrow down the image recognition range of the image processing device 21c to 1/n. This reduces an image recognition time in the image processing device 21c to about 1/n and thereby allows an early detection of the target object.

Thus, the in-vehicle drive assist system according to the present invention described above has focused attention on the respective advantages of the infrastructural information and the autonomous sensor information and adjusts the detection range of the set of autonomous sensors 20 and the sighting of the detection range using the infrastructural information obtained from outside the vehicle. This allows a preferential detection of the direction in which an object such as another vehicle or a pedestrian present around the vehicle exists and the direction in which the object can be viewed first from the vehicle. As a result, by making a risk determination from the autonomous sensor information resulting from the detection by the set of autonomous sensors 20, it is possible to perform an early risk determination, while maintaining reliability.

Although the preferred embodiments of the present invention have thus been described above, the present invention is by no means limited to the embodiments described above. Various modifications can be made in practicing the present invention without departing from the gist thereof.

For example, in providing information to the driver, when the same target object can be recognized from either of the infrastructural information and the autonomous sensor information, the reliability of the information is sufficiently high compared with the case when the target object can be recognized only from the infrastructural information or from the autonomous sensor information. In that case, therefore, a method for providing information may also be changed. By changing the method to one which intensifies the color, shape, sound, or the like of the display, it is possible to give a sense of relief to the driver.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

(Aspects)

Aspects of the disclosure described herein are set out in the following clauses.

As an aspect of the disclosure, an in-vehicle drive assist system is provided as follows. The system is configured to receive, from outside a vehicle, external information including positional information of at least one object which is either an other vehicle or a pedestrian present around the vehicle and to assist the vehicle to drive using the received external information. The system includes the following. An autonomous detecting unit is configured to detect the at least one object which is either the other vehicle or the pedestrian viewable from the vehicle. A control unit is configured to perform a control operation for adjusting at least one of a detection range of the autonomous detecting unit and sighting of the detection range using the positional information of the object included in the external information. An object detection determining unit is configured to detect whether or not the object is detected by the autonomous detecting unit of which at least one of the detection range and the sighting of the detection range has been adjusted by the control unit. A risk determining unit is configured to determine a risk of the vehicle relative to the object when it is determined that the object is detected by the object detection determining unit. A drive assist unit is configured to provide drive assistance in accordance with a result of the determination by the risk determining unit.

Here, the autonomous sensors 20 may serve as the above autonomous detecting unit. The detection range control device 32 may serve as the above control unit. The infrastructural information determining device 31 may serve as the object detection determining unit. The risk-level determining device 33 may serve as the risk determining unit. The information providing device 40 and the vehicle-drive control device 50 may serve as the drive assist unit.

Thus, attention is focused on the respective advantages of roadside information and information (which will be referred to as autonomous sensor information) provided by the autonomous detecting unit and adjusts the detection range of the autonomous detecting unit, the sighting of the detection range, and the like using the roadside information obtained from outside the vehicle. This allows the autonomous detecting unit to perform a preferential detection in the direction in which an object such as another vehicle or a pedestrian present around the vehicle exists and in the direction in which the object can be viewed first from the vehicle. As a result, by determining a risk from the information detected by the autonomous detecting unit, it is possible to make an early risk determination, while maintaining reliability.

In the drive assist system, the control unit may perform the control operation for adjusting the sighting of the detection range based on the position of the object. This allows an early-stage detection of the object using the autonomous detecting unit capable of obtaining highly reliable information.

In the drive assist system, the control unit may perform the control operation for adjusting the detection range such that it is narrowed down based on the position of the object. In the drive assist system, the autonomous detecting unit may include a camera for sensing an image around the vehicle, and the control unit can achieve a more remarkable effect by performing a control operation for adjusting a viewing angle which is an image sensing range of the camera such that it is reduced.

That is, after the viewing angle of the camera is reduced, the number of pixels assigned to the reduced viewing angle is larger than that before the viewing angle is reduced. This allows recognition of an object at a further distance away from the camera than before the viewing angle is reduced. For example, when the viewing angle is reduced to 1/n, it becomes possible to recognize an object at an approximately n times larger distance away from the camera.

As another aspect, a method is provided for performing drive assistance in a vehicle having an autonomous detecting unit detecting a viewable object which is at least one of (i) an other vehicle and (ii) a pedestrian. The method includes the following: receiving, from outside the vehicle, external information including positional information of an object outside the vehicle; performing a control operation for adjusting at least one of (i) a detection range of the autonomous detecting unit and (ii) sighting of the detection range, using positional information of the object included in the received external information; making a first determination as to whether or not an object is detected by the autonomous detecting unit after at least one of (i) the detection range of the autonomous detecting unit and (ii) the sighting of the detection range is adjusted; making a second determination about a risk of the vehicle relative to the object when the first determination is affirmed; and providing a drive assistance in accordance with a result of the second determination. Adopting the method of the another aspect can produce the same advantage as that of the above drive assist system.

It will be obvious to those skilled in the art that various changes may be made in the above-described embodiments of the present invention. However, the scope of the present invention should be determined by the following claims.

What is claimed is:

1. A drive assist system for a vehicle, the drive assist system receiving, from outside the vehicle, external information including positional information of an object outside the vehicle to thereby assist the vehicle to travel, the drive assist system comprising:

an autonomous detecting unit configured to detect a viewable object which is at least one of (i) an other vehicle and (ii) a pedestrian;

a control unit configured to perform a control operation for adjusting at least one of (i) a detection range of the autonomous detecting unit and (ii) sighting of the detection range, using positional information of the object included in the received external information;

an object detection determining unit configured to make a determination as to whether or not an object is detected by the autonomous detecting unit after at least one of (i) the detection range of the autonomous detecting unit and (ii) the sighting of the detection range is adjusted by the control unit;

a risk determining unit configured to make a determination about a risk of the vehicle relative to the object when the determination by the object detection determining unit is affirmed; and a drive assist unit configured to provide a drive assistance in accordance with a result of the determination by the risk determining unit.

2. The drive assist system according to claim 1, wherein the control unit performs the control operation for adjusting the sighting of the detection range based on the positional information of the object.

3. The drive assist system according to claim 1, wherein the control unit performs the control operation for the detection range such that it is narrowed down based on the positional information of the object.

4. The drive assist system according to claim 3, wherein the autonomous detecting unit includes a camera for sensing an image outside the vehicle, and the control unit performs the control operation for adjusting a viewing angle, which is an image sensing range of the camera, such that it is reduced.

5. A method for performing drive assistance in a vehicle having an autonomous detecting unit detecting a viewable object which is at least one of (i) an other vehicle and (ii) a pedestrian, the method comprising:

receiving, from outside the vehicle, external information including positional information of an object outside the vehicle;

performing a control operation for adjusting at least one of (i) a detection range of the autonomous detecting unit and (ii) sighting of the detection range, using positional information of the object included in the received external information;

making a first determination as to whether or not an object is detected by the autonomous detecting unit after at least one of (i) the detection range of the autonomous detecting unit and (ii) the sighting of the detection range is adjusted;

making a second determination about a risk of the vehicle relative to the object when the first determination is affirmed; and providing a drive assistance in accordance with a result of the second determination.

* * * * *